(No Model.) 3 Sheets—Sheet 1.
M. J. HEAPHY.
CUT-OFF VALVE.
No. 406,443. Patented July 9, 1889.
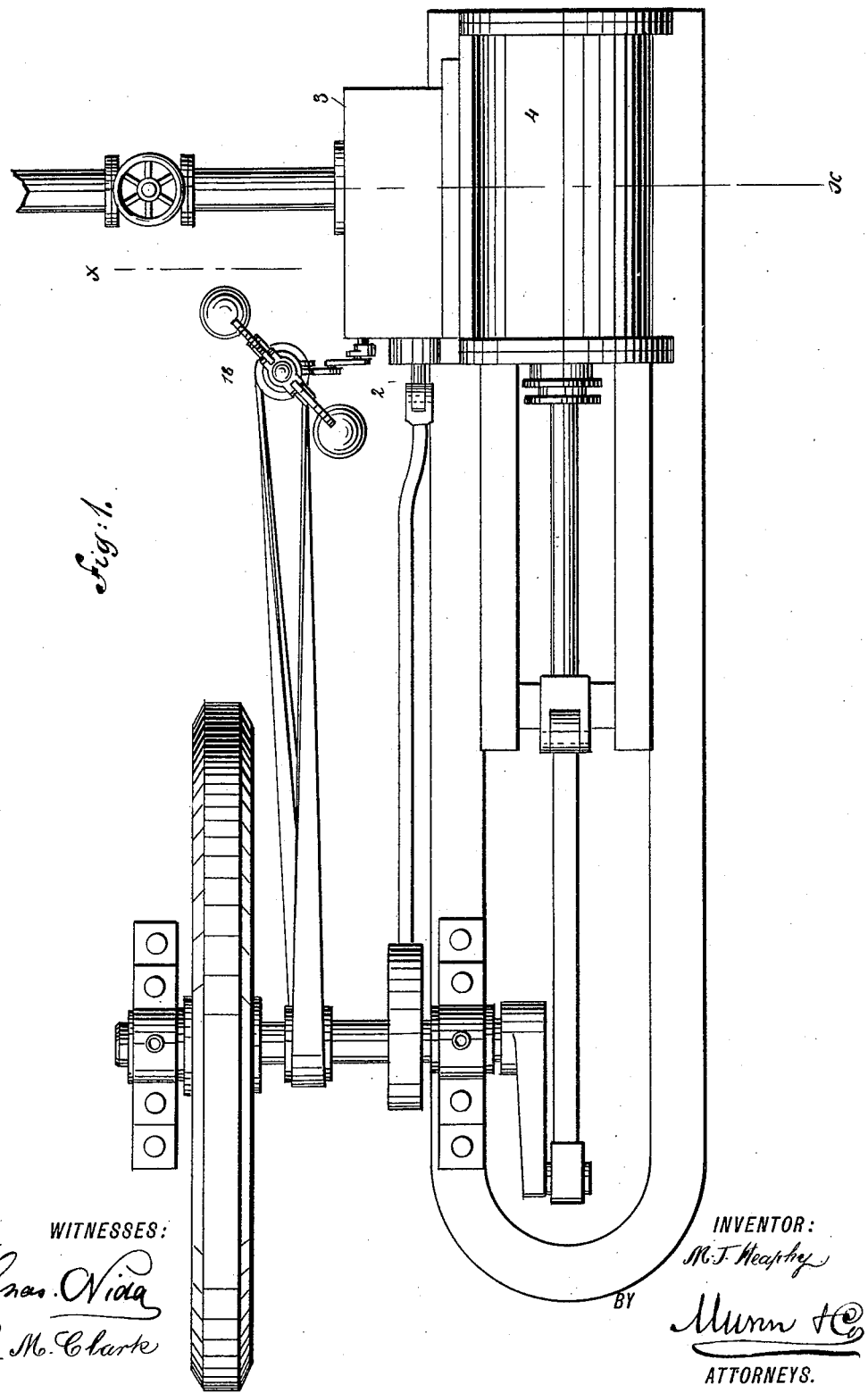
WITNESSES:
Chas. Nida
E. M. Clarke
INVENTOR:
M. J. Heaphy
BY
Munn & Co.
ATTORNEYS.

(No Model.) 3 Sheets—Sheet 2.
M. J. HEAPHY.
CUT-OFF VALVE.
No. 406,443. Patented July 9, 1889.
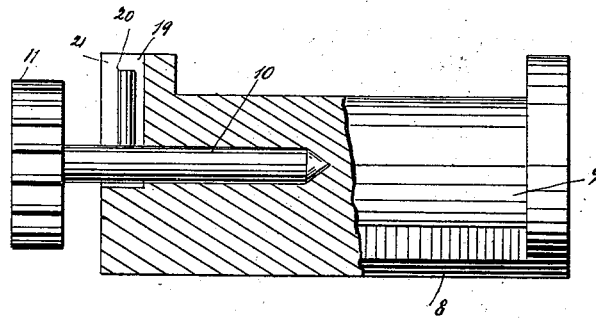
Fig. 3.
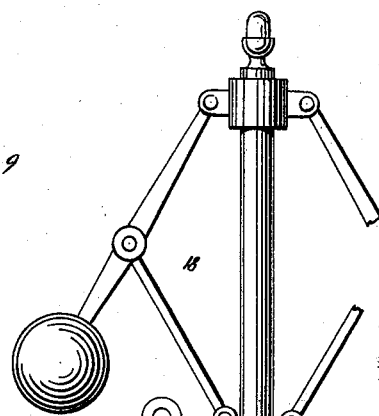
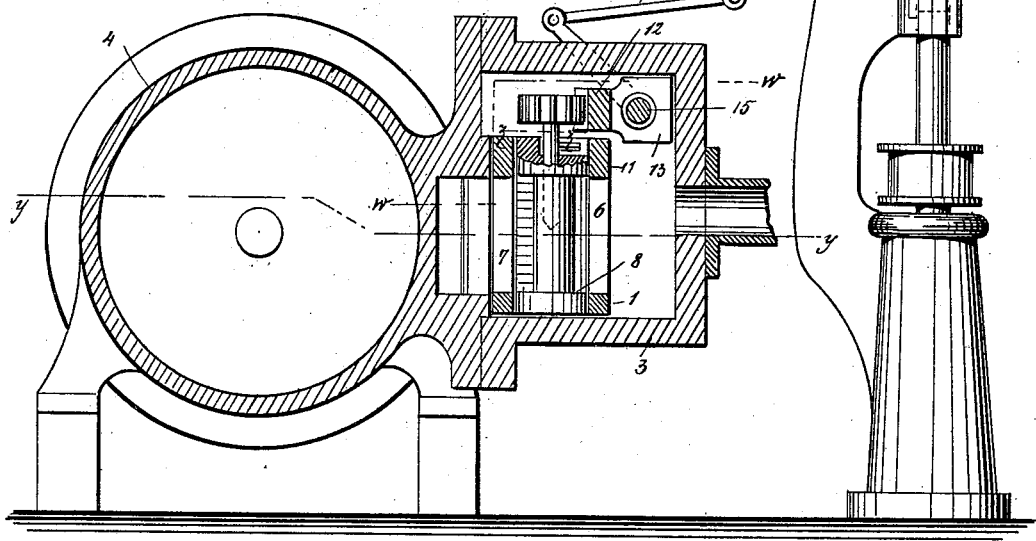
Fig. 2.
WITNESSES:
Chas. Nida
E. M. Clark
INVENTOR:
M. J. Heaphy
BY Munn & Co.
ATTORNEYS.

(No Model.) 3 Sheets—Sheet 3.

M. J. HEAPHY.
CUT-OFF VALVE.

No. 406,443. Patented July 9, 1889.

WITNESSES:
Chas O'Nida
C. Sedgwick

INVENTOR:
M. J. Heaphy
BY Munn & Co.
ATTORNEYS.

UNITED STATES PATENT OFFICE.

MICHAEL J. HEAPHY, OF BROOKLYN, NEW YORK.

CUT-OFF VALVE.

SPECIFICATION forming part of Letters Patent No. 406,443, dated July 9, 1889.

Application filed August 2, 1888. Serial No. 281,833. (No model.)

*To all whom it may concern:*

Be it known that I, MICHAEL J. HEAPHY, of the city of Brooklyn, in the county of Kings and State of New York, have invented a new and Improved Cut-Off Valve, of which the following is a full, clear, and exact description.

The invention will be first described, and then specifically pointed out in the claims.

Reference is to be had to the accompanying drawings, forming a part of this specification, in which similar figures of reference indicate corresponding parts in all the views.

Figure 4:
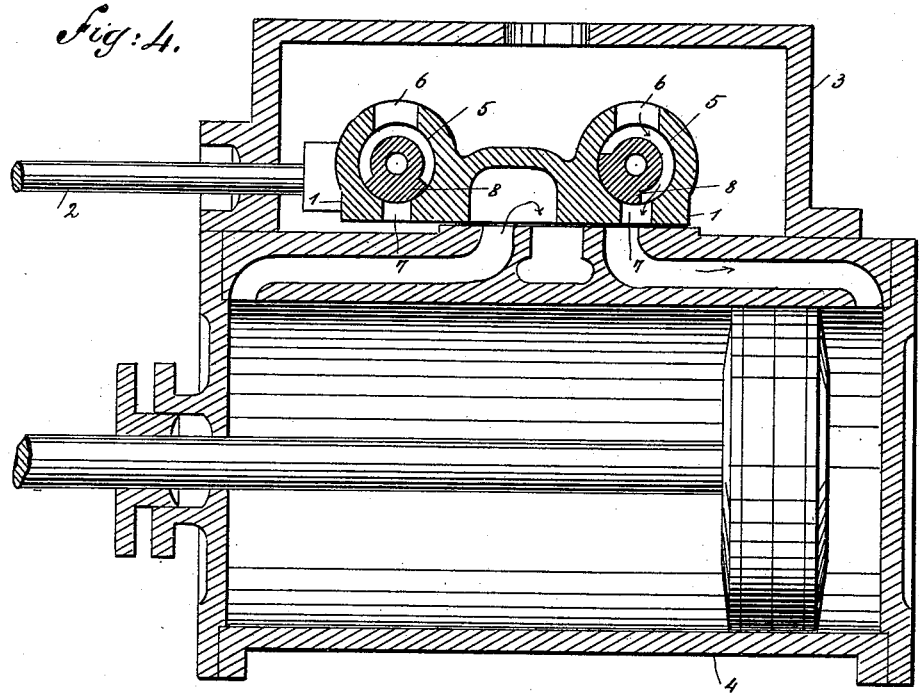
Figure 5:
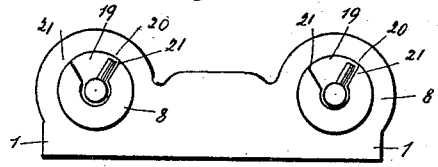
Figure 6:
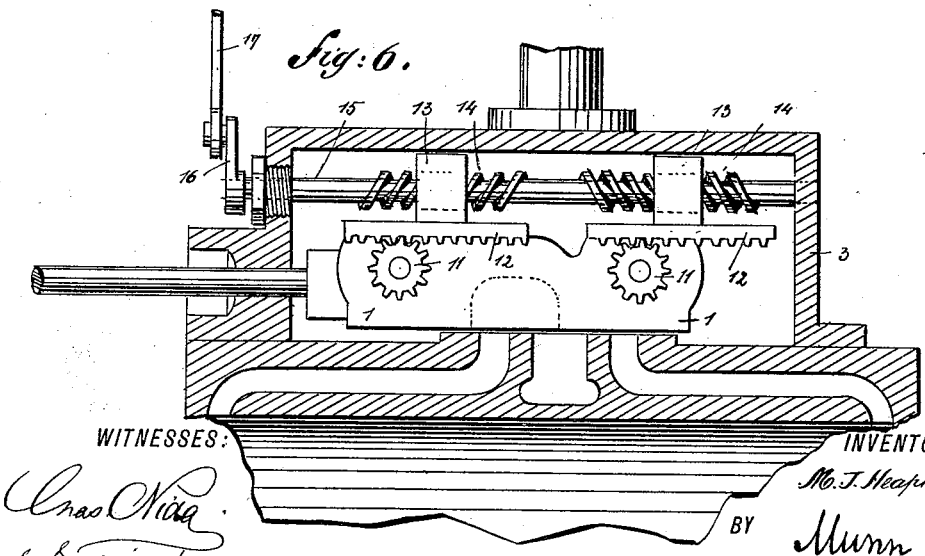

Figure 1 is a plan view of a portion of an engine with the invention applied. Fig. 2 is a vertical section on the line $x\,x$, Fig. 1. Fig. 3 is a detail view of one of the rotary valves partly broken away. Fig. 4 is a horizontal section on the line $y\,y$, Fig. 2, showing the valves. Fig. 5 is a detail view of the valves, parts being in section on the line $z\,z$, Fig. 2; and Fig. 6 is a horizontal section of the valve mechanism on the line $w\,w$, Fig. 2.

In the construction of this invention the slide-valves 1, having the valve-rod 2 and located in the steam-chest 3, adjacent to the cylinder 4, are formed with the cylindrical seats 5, and the ports 6 7, opening into the steam-chest and the cylinder, respectively. Within the cylindrical seats 5 are located rotary valves 8 formed with the circumferential recessed portion 9, for the passage of steam through the ports 6 and 7 in slide-valves 1.

The upper ends of the rotary valves 8 are provided with shafts 10 loosely resting in the valves and having pinion-wheels 11, which mesh with racks 12 mounted on the screw-threaded nuts 13, engaging the right and left screw-threaded portions 14 of the rotary shaft 15, having its bearing in the walls of the steam-chest. The shaft 15 is operated by a crank 16 at one end connected by a series of pivoted levers 17 with the engine-governor 18. It is obvious that the shaft 15 may be connected with the governor by any other suitable mechanism.

The tops of the rotary valves 8 are formed with a quadrantal-shaped recess 19, in which is located a pin 20, projecting from the shaft 10. In the rotary movement of the latter the pin 20 is alternately moved against the shouldered ends 21 of the recess 19, and turns the rotary valve 8 to open or close the port 7.

In the operation of the invention the rotary valves 8 move with the slide-valves 1 without rotating, nearly to the end of the stroke of the slide-valve rod, the pinions 11 turning the shafts 10 in their sockets without affecting the valves 8. At the last of the stroke, the pins 20 being brought in contact with the shoulders 21 of recess 19, the valves 8 are rotated by the further movement of pins 20 a distance sufficient to alternately open and close the ports 7. The passage of steam is regulated by the action of the governor 18 and connections with the shaft 15. As the latter is rotated thereby movement is communicated through nuts 13 and racks 12 to pinions 11, and by the action of pins 20 on shoulders 21 of recesses 19, causing the valves 8 to open and close the ports 7 to a greater or less degree according to the action of the governor. By this means the steam is effectively admitted to and cut off from the cylinder at the ends of the stroke, and the passage of steam is also automatically regulated by the governor.

Having thus described my invention, what I claim as new, and desire to secure by Letters Patent, is—

1. In a cut-off valve, a sliding valve containing a rotary valve having a recess, and a pinion with a shaft loosely mounted in the rotary valve, a projection on the shaft located in the recess and movable therein, and a rack engaging the pinion, substantially as shown and described.

2. The combination, with a sliding valve containing a rotary valve having a recess, and a pinion with a shaft loosely mounted in the rotary valve, and a projection on the shaft located in the recess and movable therein, of a rack engaging the pinion, a rotary threaded shaft engaging a nut on the rack, and an engine-governor connected with and operating the rotary shaft, substantially as shown and described.

3. The combination, with a double slide-valve containing rotary valves having recesses, pinions with shafts loosely mounted in the rotary valves, and projections on the shafts located in the recesses and movable therein, of racks engaging the pinions, a right and left hand screw-threaded rotary shaft engaging threaded nuts on the racks, and an engine-governor connected with and operating the rotary shaft, substantially as shown and described.

4. The combination, with valve 8, having circumferential recess 9, and the quadrantal-shaped recess 19 in one end, of the pinion 11 with shaft 10 loosely mounted in valve 8, and having pin 20 located in recess 19, substantially as shown and described.

5. The combination, with double slide-valve 1, containing rotary valves 8, having circumferential recesses 9, and quadrantal-shaped recesses 19, pinions 11, with shafts 10 loosely mounted in valves 8, and lateral pins 20 located in recesses 19, of racks 12, engaging pinions 11, a rotary shaft 15, with right and left screw-threaded portions 14 engaging nuts 13 on racks 12, and engine-governor 18, connected by pivoted levers 17, and crank 16, with shaft 15, substantially as shown and described.

MICHAEL J. HEAPHY.

Witnesses:
EDWARD W. CADY,
EDGAR TATE.